United States Patent
Pendar et al.

(10) Patent No.: US 10,394,631 B2
(45) Date of Patent: Aug. 27, 2019

(54) ANOMALY DETECTION AND AUTOMATED ANALYSIS USING WEIGHTED DIRECTED GRAPHS

(71) Applicant: Callidus Software, Inc., Dublin, CA (US)

(72) Inventors: Nick Pendar, San Ramon, CA (US); Terison Gregory, Dublin, CA (US)

(73) Assignee: Callidus Software, Inc., Dublin, CA (US)

( * ) Notice: Subject to any disclaimer, the term of this patent is extended or adjusted under 35 U.S.C. 154(b) by 144 days.

(21) Appl. No.: 15/708,100

(22) Filed: Sep. 18, 2017

(65) Prior Publication Data

US 2019/0087248 A1    Mar. 21, 2019

(51) Int. Cl.

| | |
|---|---|
| *G06F 11/00* | (2006.01) |
| *G06N 5/02* | (2006.01) |
| *G06F 11/34* | (2006.01) |
| *G06F 11/30* | (2006.01) |
| *G06N 5/00* | (2006.01) |
| *G06N 20/00* | (2019.01) |

(52) U.S. Cl.
CPC ........ *G06F 11/004* (2013.01); *G06F 11/3006* (2013.01); *G06F 11/3409* (2013.01); *G06N 5/003* (2013.01); *G06N 5/02* (2013.01); *G06N 20/00* (2019.01)

(58) Field of Classification Search
CPC ............. G06F 11/3006; G06F 11/3409; G06F 11/079; G06F 11/30; G06F 11/3452
See application file for complete search history.

(56) References Cited

U.S. PATENT DOCUMENTS

| | | | | |
|---|---|---|---|---|
| 9,798,876 | B1* | 10/2017 | Parker-Wood | ........ G06F 21/554 |
| 2013/0298184 | A1* | 11/2013 | Ermagan | .................. G06F 21/54 |
| | | | | 726/1 |
| 2018/0024901 | A1* | 1/2018 | Tankersley | ........ G06Q 10/06393 |
| | | | | 707/694 |
| 2018/0219889 | A1* | 8/2018 | Oliner | .................. H04L 63/1425 |

* cited by examiner

*Primary Examiner* — Charles Ehne (57) ABSTRACT

A method includes receiving a data set. The data set includes a plurality of data subsets wherein each data subset is associated with one transaction in a fully or partially masked network. The method further includes processing each data subset according to a plurality of rules to generate a plurality of activation values and an output for the each data subset. The plurality of activation values and the output for the each data subset form an activation pattern for the each data subset. The method also includes generating a predictive model based on the activation patterns. The method further includes identifying a subset of transactions as outliers based on the predictive model.

20 Claims, 8 Drawing Sheets

ANOMALY DETECTION AND AUTOMATED ANALYSIS USING WEIGHTED DIRECTED GRAPHS

BACKGROUND

In complex systems or networks, there may be a large number of factors with complicated interrelationships that affect the output of the system or network. For example, in a large scale communication network, factors such as channel quality, bandwidth, latency, and error rate among others may affect network performance. Thus, when anomalous system or network behavior is detected (e.g. unusually high or low network performance), it may be difficult to pinpoint the particular factor or factors that are the root cause of such anomalous behavior.

In addition, many networks and systems require the ability to detect and analyze anomalous behavior in situations where the inner workings of the systems are unknown. This adds another layer of complexity to the task of determining the causes of anomalous system behavior.

SUMMARY

Accordingly, there is a need for an efficient way to detect and analyze such anomalous behavior in a system, even when the inner workings of the system are unknown. The embodiments described herein provide for the detection and analysis of anomalous behavior in complex networks and systems represented as weighted directed graphs. In some embodiments, a method performed by a computing device is disclosed. The method includes receiving a data set. The data set includes a plurality of data subsets wherein each data subset is associated with one transaction. The method further includes processing each data subset according to a plurality of rules to generate a plurality of activation values and an output for each data subset. The plurality of activation values and the output for each data subset form an activation pattern for the each data subset. The method also includes generating a predictive model based on the activation patterns. The method further includes identifying a subset of transactions as outliers based on the predictive model.

In some embodiments the identifying includes comparing plurality of activation values to values generated by the predictive model evaluating the data set and identifying the subset of transactions as outliers responsive to the comparison being greater than a threshold value. It is appreciated that in some embodiments the predictive model is based on a regression algorithm.

The method may further include comparing each activation value generated by the predictive model evaluating the data set to the plurality of activation values generated based on the plurality of rules and identifying a subset of activation values as outliers responsive to the comparison being greater than a threshold value.

In some embodiments, the plurality of rules based on weight associated with each term of the predictive model may be ordered, e.g., ascending order, descending order, etc. It is appreciated that a weight associated with a term of the predictive model indicates the associated rule impact on output of a transaction, wherein a first weight of a first term greater than a second weight of a second term indicates that a rule associated with the first weight has more impact on output of the transaction in comparison to a rule associated with the second weight. A subset of rules of the plurality of rules may be formed by selecting a predetermined high ordered rules. It is appreciated that in some embodiments, the identified outliers may be processed based on the subset of rules of the plurality of rules.

These and other features and aspects of the concepts described herein may be better understood with reference to the following drawings, description, and appended claims.

DETAILED DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," "interior," "exterior," "external", "internal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

As discussed above, the outputs of large complex systems may be based on numerous factors with complex interrelationships, and thus pinpointing certain factors related to anomalous system behavior can be difficult. Thus, there is a need for an efficient way to detect and analyze such anomalous behavior in a system, even when the inner workings of the system are unknown. The embodiments described herein enable the detection and analysis of anomalous behavior in such systems modeled as weighted directed graphs.

Many networks and systems can be represented as weighted directed graphs. Weighted directed graphs may consist of a plurality of vertices, each vertex representing a function, or rule for processing information. When information is processed according to the function or rule of a vertex, the value generated may be referred to as an activation value. The vertices of a weighted directed graph may be connected by edges, which define the relationships between the vertices of the weighted directed graph. The activation values for a set of vertices may be referred to as an activation pattern. Weighted directed graphs may allow for the analysis of complex systems, even in situations where the inner workings of the systems are not readily observable (i.e. a masked weighted directed graph where the activation functions and edges are hidden).

Figure 1:
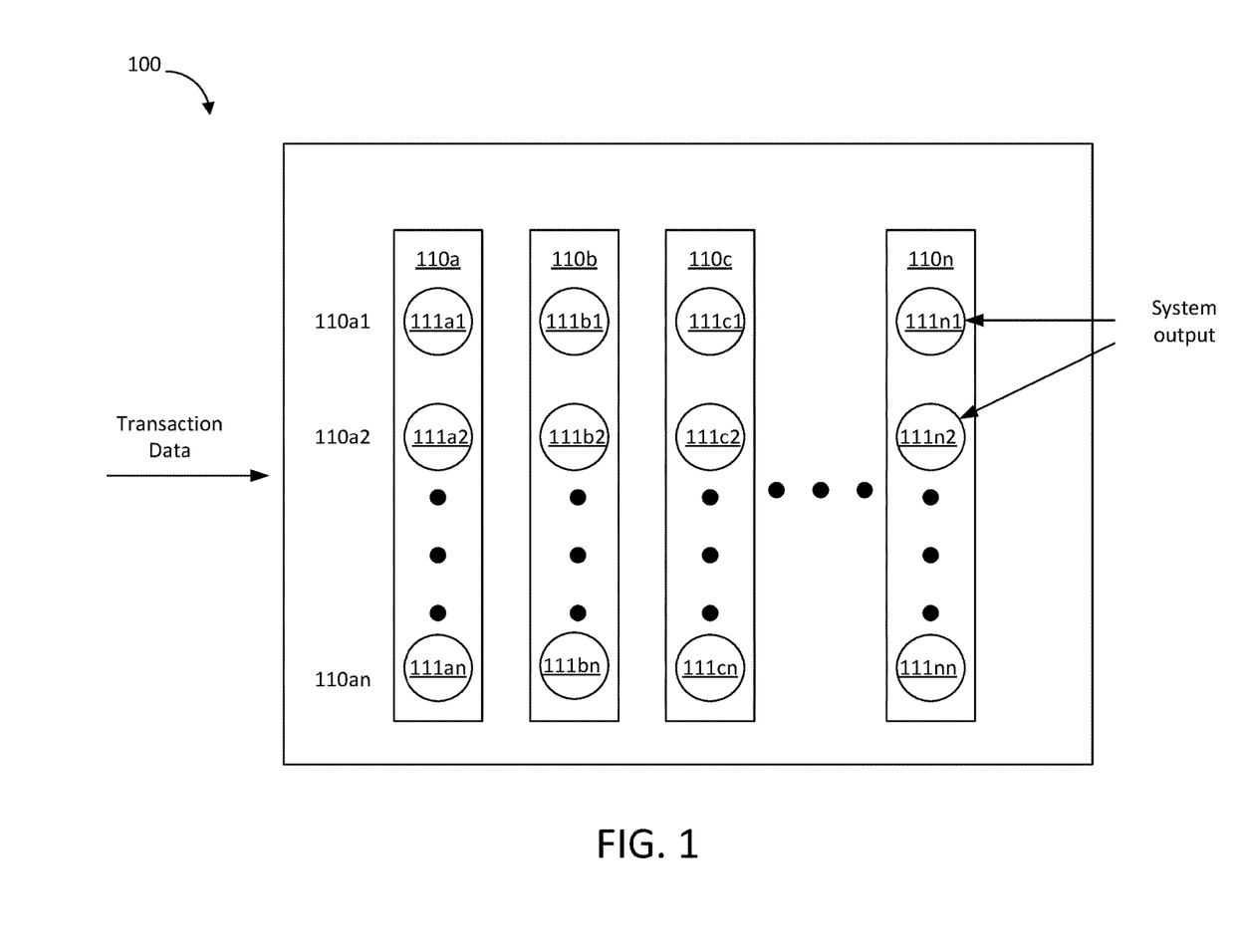
FIG. 1 shows an illustrative system in accordance with some embodiments.

FIG. 1 illustrates a system 100, represented as a weighted graph having one or more sets of rules for processing information. The system 100 may be any type of system based on one or more sets of rules for processing information, e.g., communications network, commission calculation network, artificial intelligence system, etc. In the embodiments described below, system 100 is a system for analyzing the performance of a communications network. However, system 100 may also represent a sales tracking system, a malware detection system, or benefits management system, among others. The system 100 may receive as input, a data set representing any appropriate transaction. In a network efficiency analysis system, the data set may include information regarding the amount of data transmitted over a particular unit of time, the error rate, the propagation time, latency, signal interference, and the channel quality, for example. The system 100 includes one or more set of rules 110a-110n, which may be used to process the data set that is fed into the system in order to generate activation values, e.g., $111a1, \ldots 111an, 111b1, \ldots, 111bn, \ldots, 111n1, \ldots, 111nn$. Activation values may represent the values generated by the one or more sets of rules 110a-110n after processing the data set. Each of the rule sets 110a-110n may include one or more rules for governing how particular information is to be processed. For example, rule set 110a may contain rules $110a_1$-$110a_n$ for determining the bandwidth of a channel on which data was received. Similarly, rule set 110b may contain rules $110b_1$-$110b_n$ for determining the throughput of a communications system. Rule set 110n may contain rules for generating the output of system 100. Thus, the output of system 100 may correspond to the activation values of the rule set 110n, if they are known. In this example, rule set 110n may contain rules for determining a network performance indicator based on the activation values generated by the previous rule sets. The system 100 may process the data set using each set of rules separately or simultaneously.

In some embodiments according to some aspects of the present disclosure the detection of anomalies and recognition of features, or rules, that have the most impact on those anomalies is enabled, regardless of whether the relationships between each of the sets of rules 110a-110n are known, and whether the system outputs are known (e.g., including partially masked graphs where the system outputs are known). Analysis of partially masked graphs may involve identification of rules that influence the system outputs the most (the activation values, e.g., $111n1, \ldots, 111nn$, of rule set 110n) and do not have a high correlation with each other. Outliers in the system outputs may be determined and rules that have a high deviation from their normal values relative to other rules in the activation patterns of the outlier system outputs may be selected and ordered based on their level of deviation.

More particularly, the data may be received and structured in a weighted graph similar to that in FIG. 1. The activation values, e.g., $111a1, \ldots, 111an, 111b1, \ldots, 111bn, \ldots, 111n1, \ldots, 111nn$ may be normalized. In some embodiments, a predictive model may be used to create a predictive model based on the normalized activation values. For example, in some embodiments, a regression model may be used. It is appreciated that in some embodiments, an ensemble tree based model may be used. It is further appreciated that any supervised predictive modeling may be used and discussion with respect to the regression model, the ensemble tree based model, etc. is for illustrative example and not intended to limit the scope of the embodiments. For example, a gradient boosting machine may be used.

The predictive model may be represented as $y = \alpha + a_1 r_1 + a_2 r_2 + \ldots + a_n r_n$. It is appreciated that in some embodiments, outliers may be identified by evaluating and forming updated activation values. The updated activation values may be the received data processed by the predictive model. The output from the updated activation values may be compared to the output from former activation values. If the difference between the two is greater than a particular threshold, the transaction may be flagged as an outlier. In some embodiments, if the difference between the two is less than a particular threshold, the transaction may be flagged as an outlier. It is appreciated that the particular threshold may be user selectable depending on the system.

The received values may be evaluated by the predictive model and compared to the activation values. For example, the difference between the generated activation value based on the received data and the activation value resulting from the received data being evaluated by the generated predictive model may be determined. If the difference between the two is greater than a particular threshold, the activation value may be flagged as an outlier. The process may be repeated for each activation value of interest, thereby identifying the outliers. It is appreciated that the outliers may be defined in many different ways, e.g., outliers may be activation values that exceed the value of the predictive model by a certain value, etc. In other words, the administrator of the system may define outliers of interest and using the above system, the outliers for the activation values may be identified.

Once the predictive model is generated, a correlation matrix may be formed in order to identify weighted variables that are highly correlated to one another. Highly correlated values may indicate weighted variables that may be dependent from one another. Removing highly correlated values identifies weighted variables with no dependency or very little amount of dependency, thus reducing the number of data that may need to be analyzed. Accordingly, the main components of the system may be revealed. The remaining weighted variables may be rank ordered in order to identify activation values that contribute the most to the output. In other words, the remaining weighted variables can be used to hone in on rules that contribute the most to the output of the outliers. Thus, the rules associated with the remaining weighted variables of the identified outliers may be looked at for further analysis.

It should be noted that although discussed below using a network performance analysis system as an example, the techniques of this disclosure may apply to any system based on one or more sets of rules for processing information.

In some embodiments according to some aspects of the present disclosure the detection of anomalies and recognition of features, or rules, that have the most impact on those anomalies is enabled, regardless of whether the relationships between each of the sets of rules $110a$-$110n$ are known, but the system outputs are unknown, referred to herein as fully masked weighted graph. In this representation, the relationships between each of the sets of rules $110a$-$110n$ are unknown, as are the system outputs (e.g., activation values $111n1, \ldots, 111nn$, of rule set $110n$). Analysis of fully masked graphs may involve identification of rules that have a high variability in their activation values and do not have a high correlation with each other. Outliers in the activation patterns, e.g., $110a1, 110a2, \ldots, 110an$, of the identified rules are determined, e.g., using kernel density estimation, density based clustering, isolation forest, etc., and rules that have a high deviation from their normal values relative to other rules in the activation patterns may be selected and ordered based on their level of deviation.

For example, deviation, e.g., standard deviation, median absolute deviation, etc., between each activation value and the median, for example, may be determined. Correlation matrix for the activation values may also be formed, similar to that of partially masked system, as described above, in order to identify correlation between various activation values. Activation values with highest deviation values that are not highly correlated may be identified. Isolation forest algorithm or other similar algorithms such as kernel density algorithm or density based clustering may be used to identify outliers among the activation values that are not highly correlated.

Figure 2:
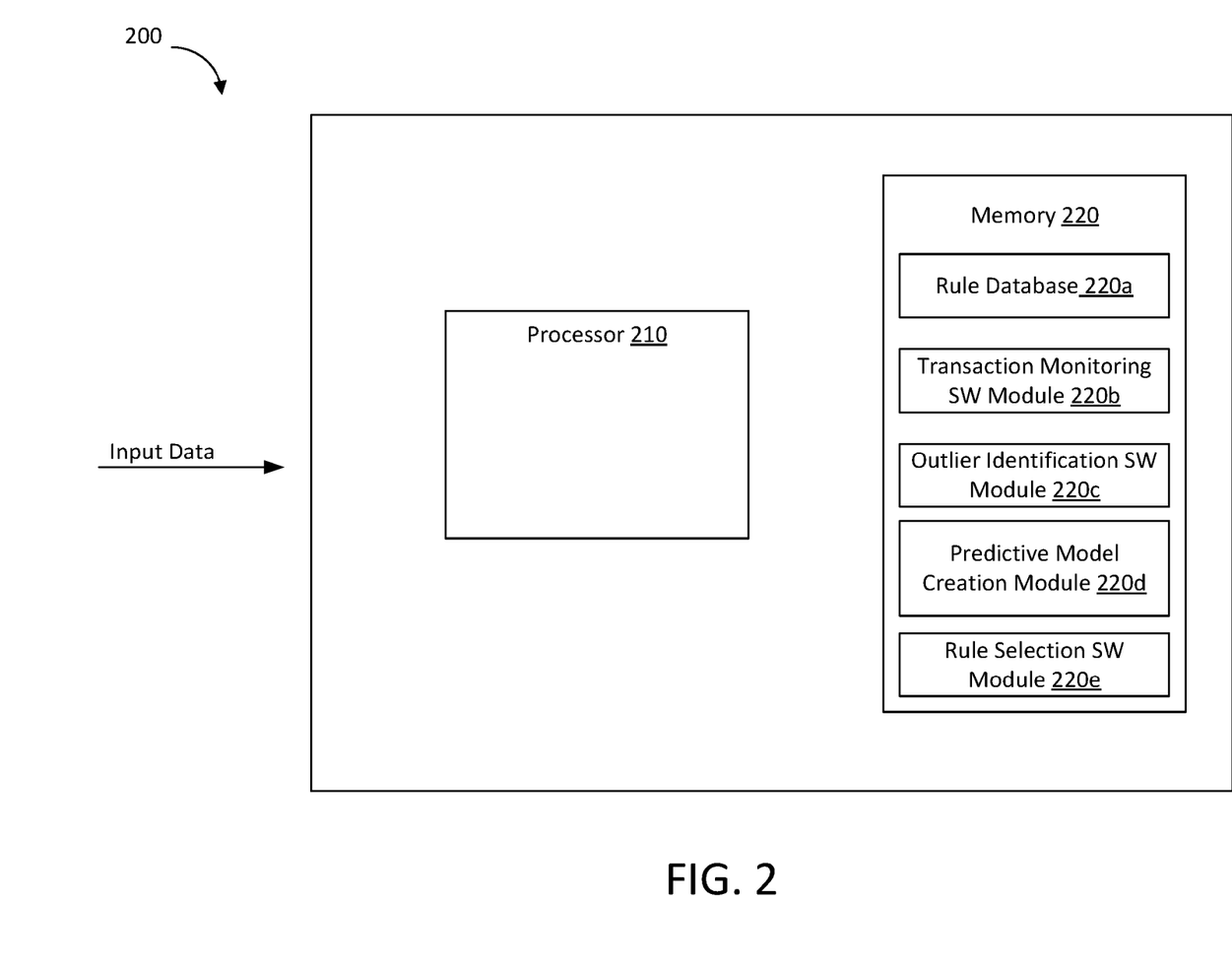
FIG. 2 shows a hardware block diagram of a computing device in accordance with some embodiments.

FIG. 2 illustrates a computing device 200 for analyzing the performance of a network in accordance with some embodiments. Computing device 200 may be part of a server monitoring data traffic in and out of a network, for example. Computing device 200 may be an example of a system represented by a partially masked weighted graph, wherein the system outputs (in this case, the network performance indicators for each user) are known. The computing device 200 may include a processor 210, a memory 220, and various other components not shown here for simplicity. The computing device 200 may receive a data set corresponding to the transmission and/or reception of data (hereinafter "transaction") over the network. The data set may include the amount of data transmitted over a particular unit of time, the error rate, the propagation time, and the channel quality among others. Memory 220 may include a rule database 220a that stores the various rules (e.g. rules $110a$-$110n$ of FIG. 1) for processing the data set, e.g., the incoming data set. Memory 220 may also include a non-transitory computer-readable medium (e.g., one or more nonvolatile memory elements, such as EPROM, EEPROM, Flash memory, a hard drive, and so on) that may store at least the following software (SW) modules:

A rule database 220a stores various rules, e.g., rules $110a, \ldots, 110n$, to be applied to the received input data.

A transaction monitoring SW module 220b for processing a data set in accordance with the plurality of rules stored in the rule database 220a and generating an activation value for each rule based on the data set. The transaction monitoring SW module 220b may also enable monitoring of the activation patterns for each transaction over a period of time, or over a number of transactions and generate a transaction matrix based on the activation pattern for each transaction.

An outlier detection SW module 220c for detecting outliers in one or more outputs over the period of time or over the number of transactions and identifying one or more rules that have the most impact on the outliers, by using the results of the rule identification and paring SW module 220d and results of the rule selection SW module 220e may be used.

A rule identification and paring SW module 220d for identifying the rules having the most impact on the one or more outputs where rules with high correlation and dependencies are removed.

A rule selection SW module 220e for identifying the rules having the most impact on the system outputs and presenting them to a user for analysis.

The processor 210 may execute and run the transaction monitoring SW module 220b continuously over a period of time. During that time, in response to receiving a data set, the processor 210 may process the data set based on the rules in the rule database 220a in order to generate a plurality of activation values. More specifically, processor 210 may process the data set using each rule set sequentially or in parallel. For example, processor 210 may process the data set using the bandwidth rule set (shown in FIG. 1) first, and thus may extract information regarding the channel bandwidth and achievable signal-to-noise ratio of the network. The processor 210 may then generate as output, an activation value indicating the available channel bandwidth and the achievable signal to noise ratio. It is appreciated that the activation values may be normalized in some embodiments. For example, processor 210 may normalize the summed activation values of each rule, in order to compensate for the different units of measurement among activation values.

The processor 210 may process the data set using the throughput rule set, and generate as output, an activation value indicating the percentage of data that was successfully delivered per unit of time. For example, upon processing the data set with the measurement rule set (shown in FIG. 1), the processor 210 may generate an activation value indicating that during a 10 millisecond interval, 70% of the data transmitted was successfully delivered to a particular user. In this manner, the processor 210 may apply each rule set in turn and generate corresponding activation values. The outputs generated by applying the final rule set may be referred to as the output activation value. In the example of FIG. 2, the final rule set may contain rules for generating a network performance indication. In some embodiments, processor 210 may apply each rule set to the data set simultaneously. As discussed above, the activation values generated for one or more of the rules for a particular transaction may be referred to as an activation pattern.

Figure 3:
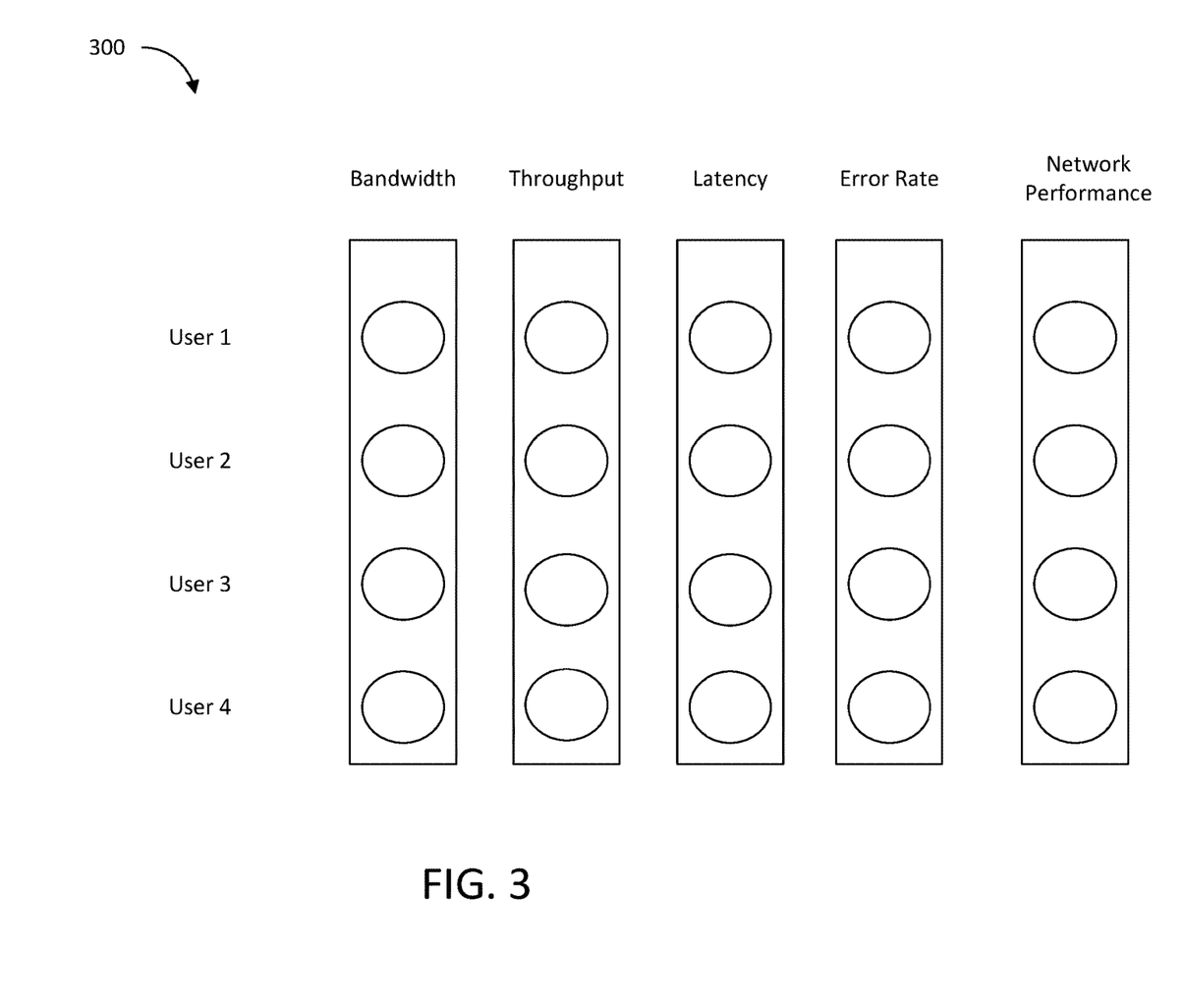
FIG. 3 shows a matrix representation of activation patterns captured over a period of time in accordance with some embodiments.

For each user in the network, processor 210 may track the activation patterns (and thus, the activation values of each rule) on a per transaction basis. Upon processing the data set for each transaction, processor 210 may then add the activation value for each rule with previous activation values generated for that rule during the predetermined time period, or during the predetermined number of transactions. Processor 210 may continue summing the activation values for each rule in this way until the expiration of the predetermined time period or until the predetermined number of transactions has been processed. Processor 210 may then add the summed activation patterns for each user to a transaction matrix where each row represents the summed activation patterns for a particular user and each column represents a particular rule. FIG. 3 illustrates a transaction matrix 300 representing the summed activation patterns for each user in the network over the predetermined period of time, or over the predetermined number of transactions. Although not shown, the values of the outputs for various rules have different units of measurement (e.g. bits/second, BER). It is appreciated that while the embodiments are described in the context of a network performance the embodiments are equally applicable to other systems, e.g., calculation of a commission based system, performance of a processing pipeline, etc.

Referring back to FIG. 2, the processor 210 may execute the predictive model creation module 220*d* to generate the predictive model and further to determine which rules (bandwidth, latency, etc.) have the most impact on the identified summed network performance indicators (system outputs). More specifically, processor 210 may generate a predictive model for the input data and the rules in the rule database 220*a* using a predictive model such as a regression analysis algorithm, ensemble tree based modelling, gradient boosting machines, etc. In some embodiments, the predictive model is created by applying a regression algorithm, ensemble tree based modelling, or gradient boosting machine to the data created by the transaction monitoring SW module 220*b*. Accordingly, a predictive model on normalized values may be created, e.g., $y = a_1 r_1 + a_2 r_2 + \ldots + a_n r_n$, where $a_1, a_2, \ldots, a_n$ represent weights associated with each rule. In other words, the greater weight value indicates that that rule has more impact on the final outcome in comparison to a lower weighted variable. In some embodiments gauging the importance of variables may be accomplished by measuring how much of the variability in the output is accounted for by each variable. In other words, based on the regression analysis, processor 210 may assign weights to each of the rules, with heavier weights corresponding to features having a higher impact, and order each rule based on its assigned weight.

Once the predictive model is created, the processor 210 may execute rule selection SW module 220*e* to identify the rules that have the most impact on the output. In some embodiments, a correlation matrix based on the created predictive model for the transaction matrix is calculated. The correlation matrix is used to determine the level of correlation between each of the rules. It is appreciated that a value of 1 may indicate the greatest correlation between two rules while a value of 0 may indicate no correlation at all between two rules. In other words, the weighted variables that are highly correlated identify rules that are highly dependent on one another. It is appreciated that rules with correlation values greater than a threshold value with highly weighted variables may be removed. Removing highly correlated values identifies weighted variables, hence rules, with no dependency or very little amount of dependency, thus reducing the number of variables that may need to be analyzed. Thus, the set of variables representing the main components of the system may be reduced. It is appreciated that the threshold value may be user selectable or settable. For example, a highly correlation value threshold may be set at greater than 0.5, greater than 0.7, greater than 0.95, etc., where rules that have a correlation value greater than the threshold value with highly weighted variables are removed.

The remaining rules may be sorted based on their respective weighted variables where highest weighted variable indicates the most impact in comparison to the lowest weighted variable.

It is appreciated that although, the correlation matrix is used in order to reduce the amount of processing and highlighting the main components of the system, in other embodiments, the entire predictive model may be used rather than a subset thereof. The remaining weighted variables may be rank ordered in order to identify activation values that contribute the most to the output.

In some embodiments the processor 210 may then execute the outlier detection SW module 220*c* to determine the outliers of the activation value and/or transactions. For example, the received input data may be evaluated by the predictive model instead of the rules. The result of the evaluation using the predictive model may be compared to the actual value of the activation value as determined by the rules. If the difference between the two is greater than a certain threshold, then that transaction may be identified as an outlier. It is appreciated that in some embodiments, the outliers may be identified on an activation value basis rather than the final output, e.g., the difference between the activation value using rules and the receive input data as evaluated by the predictive model may be determined. If the difference between the two is greater than a particular outlier threshold, e.g., settable by the user or selectable, the activation value may be flagged as an outlier. The process may be repeated for each activation value of interest. It is appreciated that the outliers may be defined in many different ways, e.g., outliers may be activation values that exceed the value of the predictive model by a certain value, etc. In other words, the administrator of the system may define outliers of interest and using the above system, the outliers for the activation values may be identified.

The rules identified by the rule selection SW module 220*e* may be analyzed for the outliers as identified by the outlier identification SW module 220*c*. In other words, the rules identified by the rule selection SW module 220*e* hones in on rules that may have the most impact on the output, therefore, reducing the processing required in comparison to when every rule has to be analyzed and looked at. Investigating the identified rules for the outliers may reveal the reasons why a particular transaction or activation value has been identified as an outlier. In situations where outliers indicate outperformance, then the outlier may be used as an example for others in order to also improve their performance. In situations where outliers indicate underperformance, then the outliers may be used as example for others in order to avoid performance degradation.

For each rule, the processor 210 may then take a predefined number of the most impactful rules and plot each on a density plot or histogram against all other activation values for that rule. In this way, a user can determine which features to analyze when attempting to identify the cause of an anomaly (outlier activation pattern).

It is appreciated that in a fully masked system, the outliers may be identified using statistical algorithms such as kernel density estimation, the Tukey range test, or any other suitable statistical algorithm. In some embodiments, identified outliers may correspond to, for example, users who have unusually high network performance, or users who have relatively low network performance. Fully masked system is described in greater detail in FIG. 4.

Figure 4:
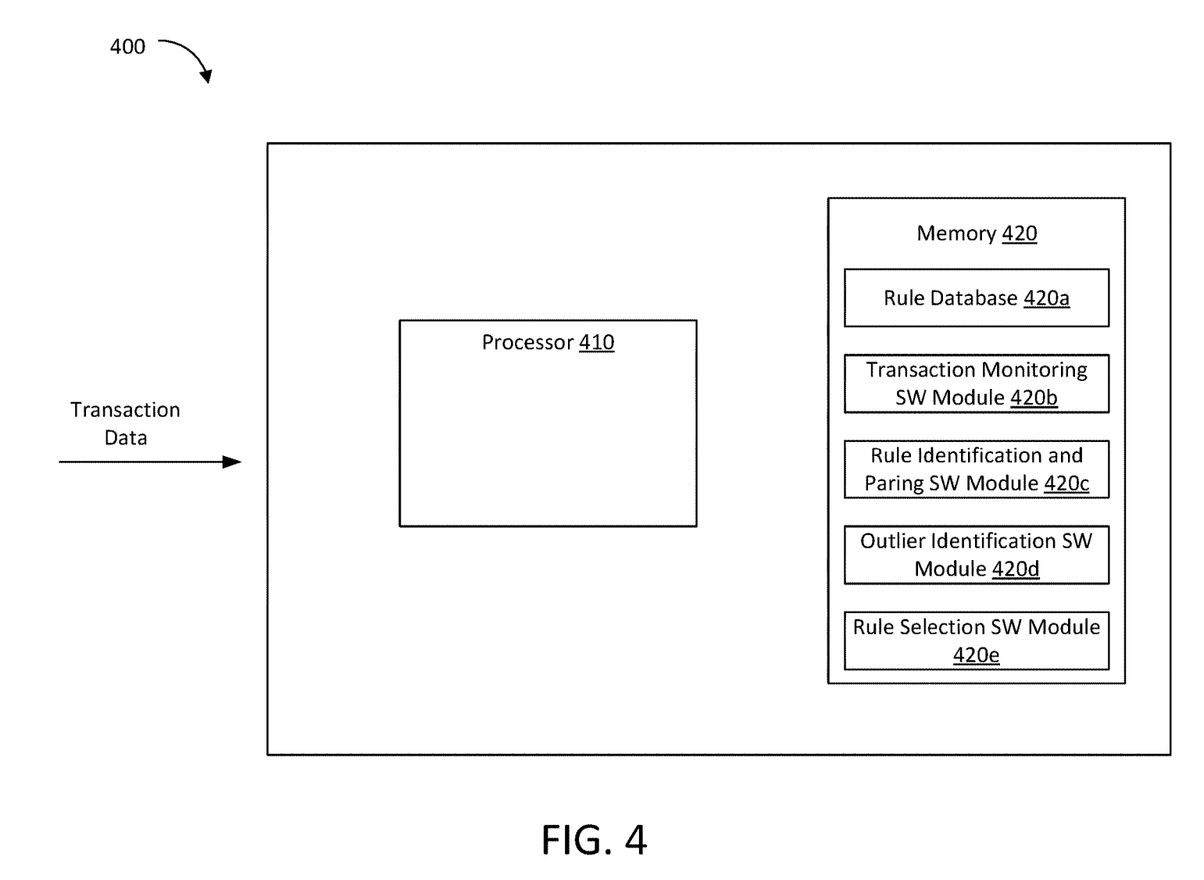
FIG. 4 shows a hardware block diagram of a computing device in accordance with some embodiments.

FIG. 4 illustrates a computing device 400 for analyzing the performance of a network in accordance with some embodiments. Computing device 400 may be part of a server monitoring data traffic in and out of a network, for example. Computing device 400 may be an example of a system represented by a fully masked weighted graph, wherein the system outputs (in this case, the network performance indicators for each user) are unknown. Computing device 400 may include a processor 410, a memory 420, and various other components not shown here for simplicity. The computing device 400 may receive a data set corresponding to the transmission and/or reception of data over the network. As used herein, a "data set" may correspond to one particular transaction, or instance of data transmission/reception. The data set may include the amount of data transmitted over a particular unit of time, the error rate, the propagation time, and the channel quality among others. Memory 420 may include a rule database 420*a* that stores the various rules for processing data sets (e.g. rules 110*a*-110*n* of FIG. 1). Memory 420 may also include a non-transitory computer-readable medium (e.g., one or more nonvolatile memory elements, such as EPROM, EEPROM, Flash memory, a hard drive, and so on) that may store at least the following software (SW) modules:

A rule database 420*a* stores various rules, e.g., rules 110*a*, . . . , 110*n*, to be applied to the received input data.

A transaction monitoring SW module 420*b* for processing a data set in accordance with the plurality of rules stored in the rule database 420*a* and generating an activation value for each rule based on the data set. The transaction monitoring SW module 420*b* may also enable monitoring of the activation patterns for each transaction over a period of time, or over a number of transactions and generate a transaction matrix based on the activation pattern for each transaction.

A rule identification and paring SW module 420*c* for identifying one or more rules potentially having a large impact on the system output and generating an analysis matrix using the identified rules.

An outlier detection SW module 420*d* for identifying outliers in the activation patterns of the analysis matrix.

A rule selection SW module 420*e* for identifying the rules having the most impact on the system outputs and presenting them to a user for analysis.

The processor 210 may execute and run the transaction monitoring SW module 420*b* continuously over a period of time. During that time, in response to receiving a data set, the processor 410 may process the data set based on the rules in the rule database 420*a* in order to generate a plurality of activation values. More specifically, processor 410 may process the data set using each rule set sequentially or in parallel. For example, processor 410 may process the data set using the bandwidth rule set (shown in FIG. 1) first, and thus may extract information regarding the channel bandwidth and achievable signal-to-noise ratio of the network. The processor 410 may then generate as output, an activation value indicating the available channel bandwidth and the achievable signal to noise ratio. It is appreciated that the activation values may be normalized in some embodiments. For example, processor 410 may normalize the summed activation values of each rule, in order to compensate for the different units of measurement among activation values.

The processor 410 may process the data set using the throughput rule set (shown in FIG. 1), and generate as output, an activation value indicating the percentage of data that was successfully delivered per unit of time. For example, upon processing the data set with the measurement rule set (shown in FIG. 1), the processor 410 may generate an activation value indicating that during a 10 millisecond interval, 70% of the data transmitted was successfully delivered to a particular user. In this manner, the processor 410 may apply each rule set in turn and generate corresponding activation values. The outputs generated by applying the final rule set may be referred to as the output activation value. In some embodiments, processor 410 may apply each rule set to the data set simultaneously. As discussed above, the activation values generated for one or more of the rules for a particular transaction may be referred to as an activation pattern.

Figure 5A:
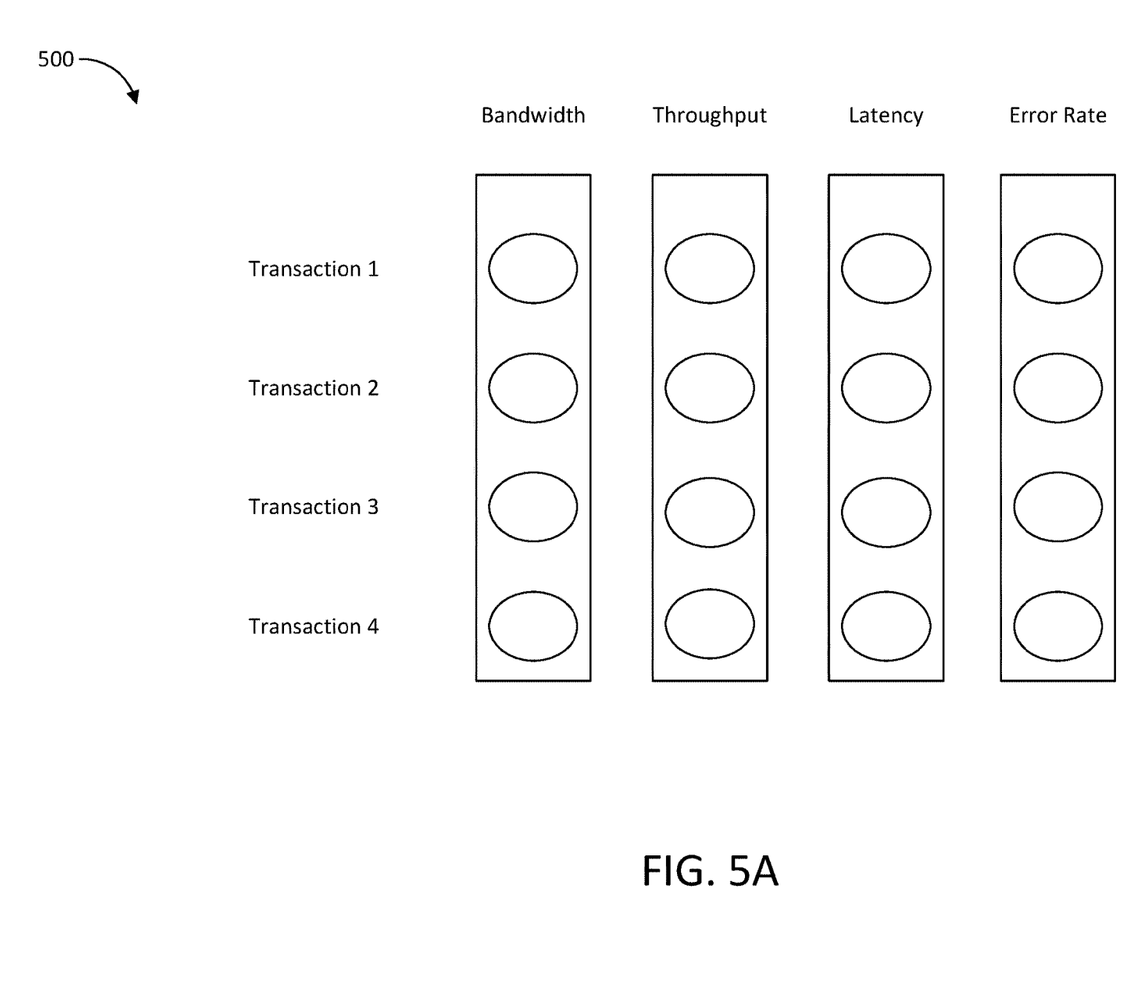
FIG. 5A shows a matrix representation of activation patterns captured over a period of time in accordance with some embodiments.

For each user in the network, processor 410 may track the activation patterns (and thus, the activation values of each rule) on a per transaction basis. Upon processing each transaction, the transaction monitoring SW module 420*b* may then add each activation pattern to a transaction matrix (shown in FIG. 5A) where each row represents the activation pattern for a particular transaction and each column represents the activation values for a particular rule. The processor 410 may continue monitoring and adding the activation patterns for each processed data set in this way until the expiration of the predetermined time period, or until the predetermined number of transactions has been reached. FIG. 5A illustrates a transaction matrix 500 representing the activation patterns of the system 100 over the predetermined period of time. Although not shown, the values of the outputs for various features have different units of measurement (e.g. bits/second, BER). It is appreciated that while the embodiments are described in the context of a network performance the embodiments are equally applicable to other systems, e.g., calculation of a commission based system, performance of a processing pipeline, etc.

Referring back to FIG. 4, processor 410 may execute the rule identification and paring SW module 420*c* to determine which rules may potentially have a large impact on network performance. Processor 410 may normalize the activation values of the matrix in order to compensate for the different units of measurement between activation values in a particular activation pattern (i.e. between activation values for different rules). Processor 410 may then calculate the standard deviation of each column in the transaction matrix. It is appreciated that in some embodiments, the processor 410 may calculate the median absolute deviation of each column in the transaction matrix. The calculated standard deviation or the calculated median absolute deviation may be sorted, e.g., from greatest value to smallest value, etc.

In some embodiments, a correlation matrix based on the transaction matrix is calculated. The correlation matrix is used to determine the level of correlation between each of the rules. It is appreciated that a value of 1 may indicate the greatest correlation between two rules while a value of 0 may indicate no correlation at all between two rules. In other words, the weighted variables that are highly correlated identify rules that are highly dependent on one another. It is appreciated that rules with correlation values, with a highly weighted variable, greater than a threshold value may be removed. Removing highly correlated values identifies weighted variables, hence rules, with no dependency or very little amount of dependency, thus reducing the number of data that may need to be analyzed. It is appreciated that the threshold value may be user selectable or settable. For example, highly correlation value threshold may be set at greater than 0.5, greater than 0.7, greater than 0.95, etc., where rules that have a correlation value greater than the threshold value are removed.

Figure 5B:
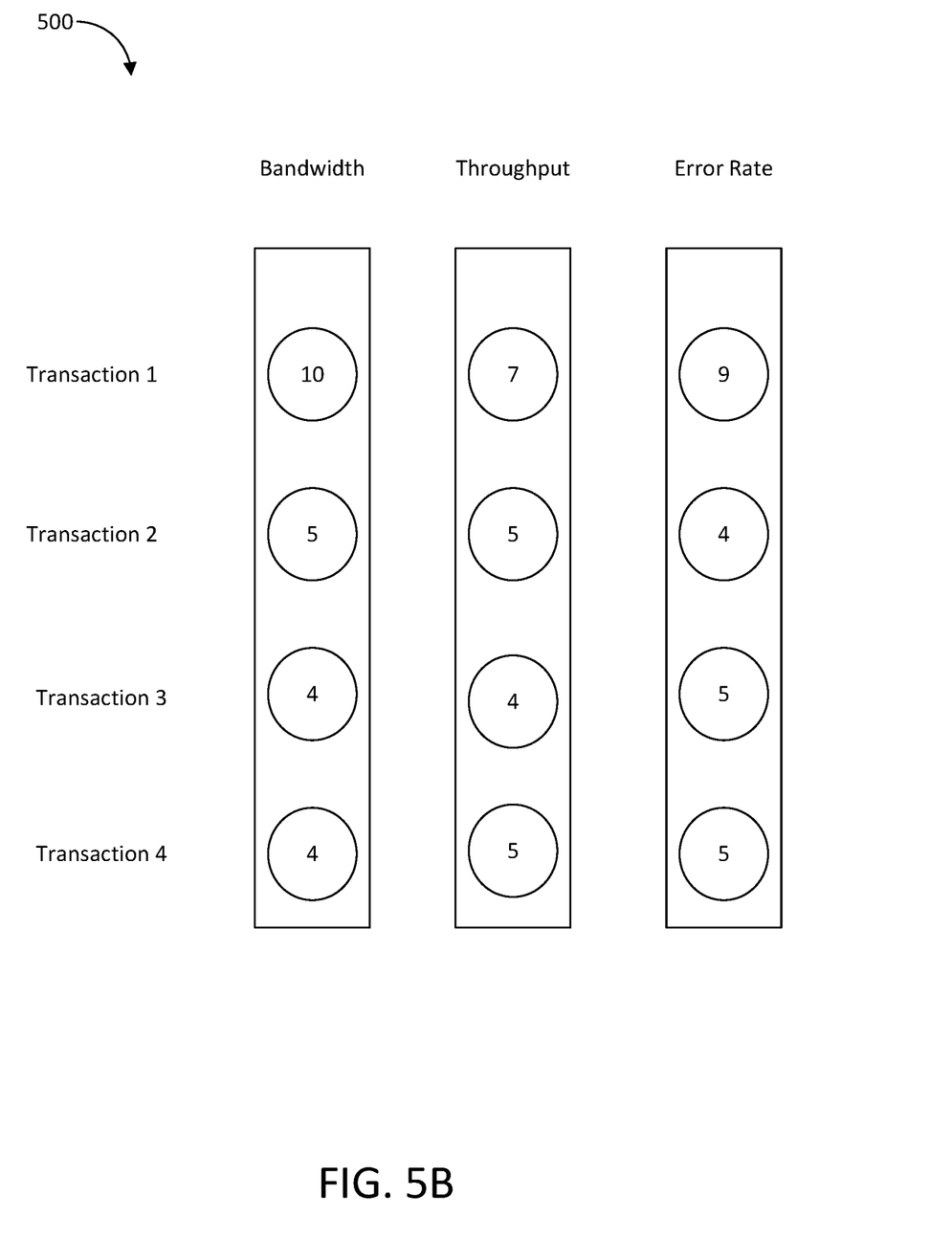
FIG. 5B shows a matrix representation of activation patterns captured over a period of time with non-relevant and/or redundant information removed in accordance with some embodiments.

Processor 410 may select for further analysis, one or more rules having a standard deviation among their activation values that exceeds a predefined threshold, while having a correlation with each of the other rules that is below a predefined correlation threshold. Processor 410 may remove from the transaction matrix each column not corresponding to one of the selected rules. In this way, processor 410 may generate a pared down transaction matrix having activation patterns that represent the activation values for rules having a potentially large impact on network performance and have relatively little information redundancy (hereinafter referred to as an analysis matrix). FIG. 5B represents an analysis matrix generated after processor 410 has removed from a transaction matrix rules that do not have a potentially large impact on network performance. In the example of FIG. 5B, network latency has been removed, indicating that it is not a potentially impactful rule with respect to network performance.

It is appreciated that although, the correlation matrix is used in order to reduce the amount of processing, in other embodiments, the entire predictive model may be used rather than a subset thereof. The remaining weighted variables may be rank ordered in order to identify activation values and rules associated therewith that contribute the most to the output.

Referring back to FIG. 4, in some embodiments, the processor 410 may execute the outlier identification SW module 420d to determine outliers in the activation patterns of the analysis matrix. More specifically, processor 410 may use any suitable machine learning algorithm, e.g., unsupervised for fully masked graphs and supervised for partially masked graphs, to identify outlier activation patterns of the selected rules. Examples of such suitable algorithms may include kernel density estimation, density based clustering, and isolation forest. In some embodiments, identified outliers may correspond to, for example, data communication transactions that have unusually large bandwidths, or unusually low error rate, etc.

In some embodiments, processor 410 may execute the rule selection SW module 420e, in order to identify which rules have the most impact on network performance (i.e. the network performance indicators that are outputs of the system 100). More specifically, for a given activation pattern, e.g., the outliers as identified by the outlier identification SW module 420d, in the analysis matrix, processor 410 may calculate how much each activation value in the given activation pattern diverges (e.g. the absolute difference) from its corresponding rule's median activation value.

It is appreciated that in some embodiments, the predictive model generated, as described in FIG. 2, may be used in conjunction with the absolute difference in order to generate a divergence score for each activation value. For example, the processor 410 may multiply the absolute difference by the absolute value of the weight assigned to the corresponding rule (e.g., as derived through the predictive modeling of FIG. 2) to generate a divergence score for each activation value and order the rules based on the divergence scores of their corresponding activation values. For example, referring again to FIG. 5B, processor 410 may analyze transaction 1 and determine the median bandwidth value of all transactions as 5, and thus the deviation for the bandwidth activation value in transaction 1 may be determined as 5. Processor 410 may multiply this value by the absolute value of the feature weight assigned to bandwidth (in the example of FIG. 5B, 1) to obtain a divergence score of 5. Similarly, processor 410 may determine the divergence score for throughput and error rate to be 2 and 4 respectively. Thus, processor 410 may order each of the rules based on each rule's deviation (e.g., in order of impact on network performance) and thus rank the bandwidth first, error rate second, and throughput third. Referring back to FIG. 4, in some embodiments, processor 410 may calculate how much each activation value in the given activation pattern diverges from its corresponding rule's median activation value based on the raw deviation (e.g., without factoring in the weights assigned to each rule or by setting the weight corresponding to each rule to 1). In some embodiments, processor 410 may set the weight corresponding to each rule to 1. In other embodiments, processor 410 may determine the weights for each rule as discussed above with respect to FIG. 2.

For each activation pattern, processor 410 may then take a predefined number of the top rules (e.g., rules with the highest divergence) and plot each on a density plot or histogram against all other values for that feature. In this way, a user can determine which features to analyze when attempting to identify the cause of the anomaly (outlier activation pattern).

Figure 6:
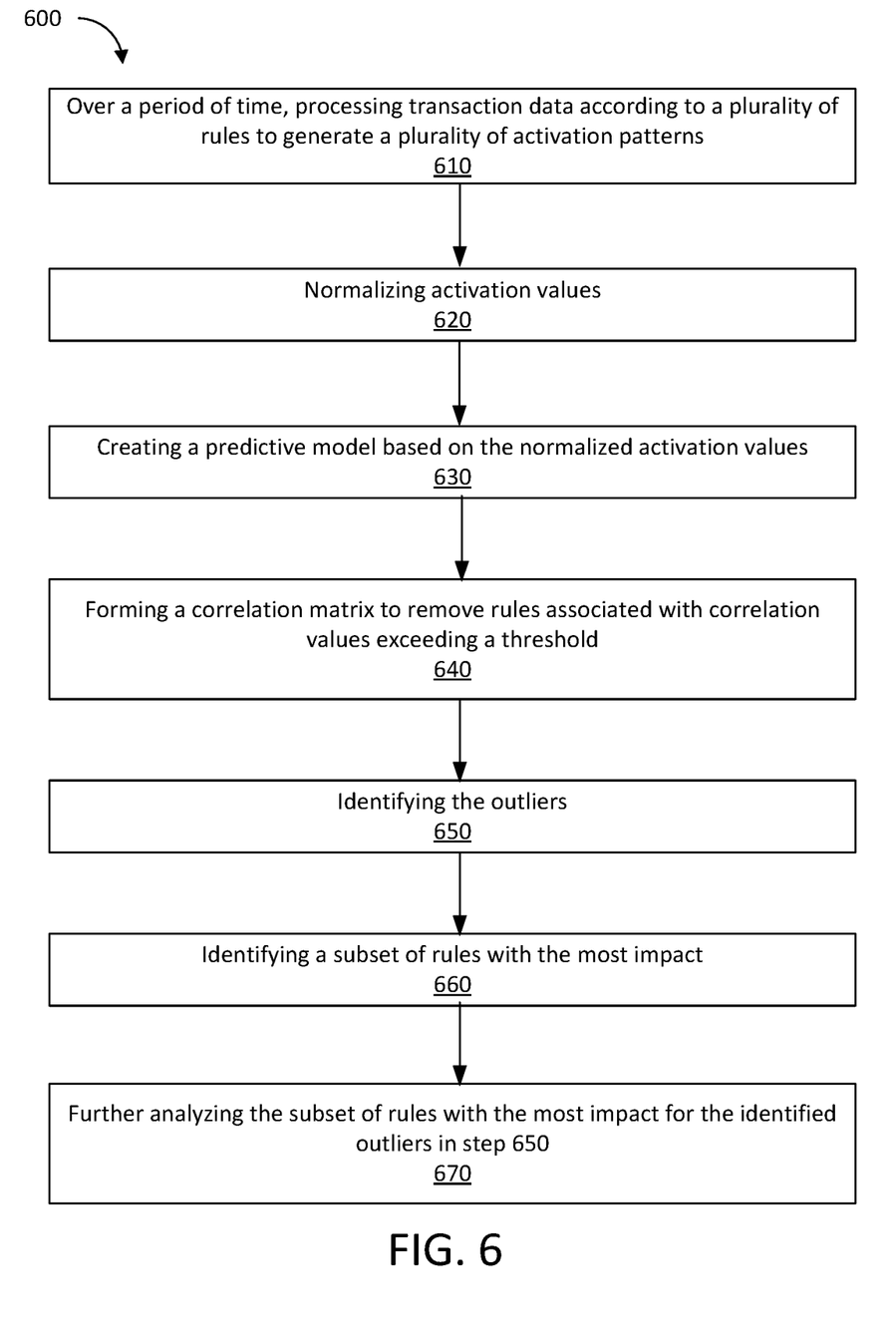
FIG. 6 shows a flow diagram of a method in accordance with some embodiments.

FIG. 6 illustrates a method 600 in accordance with some embodiments. Method 600 may be performed by any suitable computing device, such as computing device 200, of FIG. 2. The computing device 200 may receive a data set corresponding to the transmission and/or reception of data (hereinafter "transaction") over the network. The data set may include the amount of data transmitted over a particular unit of time, the error rate, the propagation time, and the channel quality among others. It is appreciated that in some embodiments, the received data may be associated with a commission based system, e.g., sales, commission percentages, etc. In yet other embodiments, the received data may be associated with the performance of a pipeline processing, e.g., bottleneck, latency, utilization, etc.

At step 610, the processor 210 may, in response to receiving the data set, process the data set and generate a plurality of activation values. More specifically, processor 210 may process the data set using each rule set sequentially. For example, processor 210 may process the data set using the bandwidth rule set (shown in FIG. 1) first, and thus may extract data regarding the channel bandwidth and achievable signal-to-noise ratio of the network. The processor 210 may then generate as output, an activation value indicating the available channel bandwidth and the achievable signal to noise ratio.

The processor 210 may process the data set using the throughput rule set, and generate as output, an activation value indicating the percentage of data that was successfully delivered per unit of time. For example, upon processing the data set with the measurement rule set (shown in FIG. 1), the processor 210 may generate an activation value indicating that during a 10 millisecond interval, 70% of the data transmitted was successfully delivered to a particular user. In this manner, the processor 210 may apply each rule set in turn and generate corresponding activation values. The outputs generated by applying the final rule set may be referred to as the output activation value. In the example of FIG. 2, the final rule set may contain rules for generating a network performance indication. In an embodiment, processor 210 may apply each rule set to the data set simultaneously. As discussed above, the activation values generated for one or more of the rules for a particular transaction may be referred to as an activation pattern.

For each user in the network, processor 210 may track the activation patterns (and thus, the activation values of each rule) on a per transaction basis. For example, the processor 210 may continue receiving data and processing to generate activation values on an ongoing basis and storing the received data and the generated activation values in a memory component, e.g., Flash memory, hard drive, etc. Upon processing each transaction, processor 210 may then add the activation value for each rule with previous activation values generated for that rule during the predetermined time period, or during the predetermined number of transactions. Processor 210 may continue summing the activation values for each rule in this way until the expiration of the predetermined time period or until the predetermined number of transactions has been processed. Processor 210 may integrate the activation values for each transaction, e.g., per user/component basis, etc. to generate the summed activation pattern for each transaction. In some embodiments, the activation values for each transaction may be summed to generate the summed activation patterns for each user/component. The process may be repeated either sequentially or in parallel for each user/component. Thus, a transaction matrix where each row represents the summed activation patterns for a particular user/component and each column represents a particular rule can be generated. FIG. 3 illustrates a transaction matrix 300 representing the summed activation patterns for each user/component in the network over the predetermined period of time, or over the predetermined number of transactions. Although not shown, the values of the outputs for various rules may have different units of measurement (e.g. bits/second, BER).

At step 620, the activation values may be normalized. At step 630, a predictive model may be created based on the normalized activation values. For example, in some embodiments, a regression model may be used. It is appreciated that in some embodiments, an ensemble tree based model may be used. It is further appreciated that any predictive modeling may be used and discussion with respect to the regression model, the ensemble tree based model, etc. is for illustrative example and not intended to limit the scope of the embodiments. For example, a gradient boosting machine may be used.

The predictive model may be represented as $y=a_1r_1+a_2r_2+ \ldots +a_nr_n$. Once the predictive model is generated, at step 640, a correlation matrix may be formed in order to identify weighted variables that are highly correlated to one another. Highly correlated values may indicate weighted variables that may be dependent from one another. Removing highly correlated values identifies weighted variables with no dependency or very little amount of dependency, thus reducing the number of data that may need to be analyzed. The remaining weighted variables may be rank ordered in order to identify activation values that contribute the most to the output.

At step 650, outliers may be identified. For example, the received input data may be evaluated by the predictive model and compared to the activation values and/or the output. For example, the generated activation values and/or their output based on the received input data being evaluated by the plurality rules is compared to the updated activation values or output based on the data input being evaluated by the predictive model. If the difference between the two is greater than a particular threshold, the activation value or output may be flagged as an outlier. The process may be repeated for each activation value of interest or transaction, thereby identifying the outliers. It is appreciated that the outliers may be defined in many different ways, e.g., outliers may be activation values that exceed the value of the predictive model by a certain value, etc. In other words, the administrator of the system may define outliers of interest and using the above system, the outliers for the activation values may be identified.

At step 660, a subset of rules with the most impact are identified, e.g., higher weighted variable for the predictive model indicate higher impact and lower weight value indicate a lower impact. At step 670, the identified rules in step 660 may be identified for the outliers identified in step 650 to further analyze the outlier transaction for better understanding of contributing factors for making a particular transaction an outlier.

In other words, the subset of rules identified in step 660 enables one to hone in on rules that may have the most impact on the output, therefore, reducing the processing required in comparison to when every rule has to be analyzed and looked at. The subset of rules in step 660 may be looked at for further analysis for the identified outliers. Thus, investigating the identified rules for the outliers may reveal the reasons why a particular transaction or activation value has been identified as an outlier. In situations where outliers indicate outperformance, then the outlier may be used as an example for other in order to also improve their performance. In situations where outliers indicate underperformance, then the outliers may be used as example for others in order to avoid performance degradation.

It should be noted that although discussed below using a network performance analysis system as an example, the techniques of this disclosure may apply to any system based on one or more sets of rules for processing information.

Figure 7:
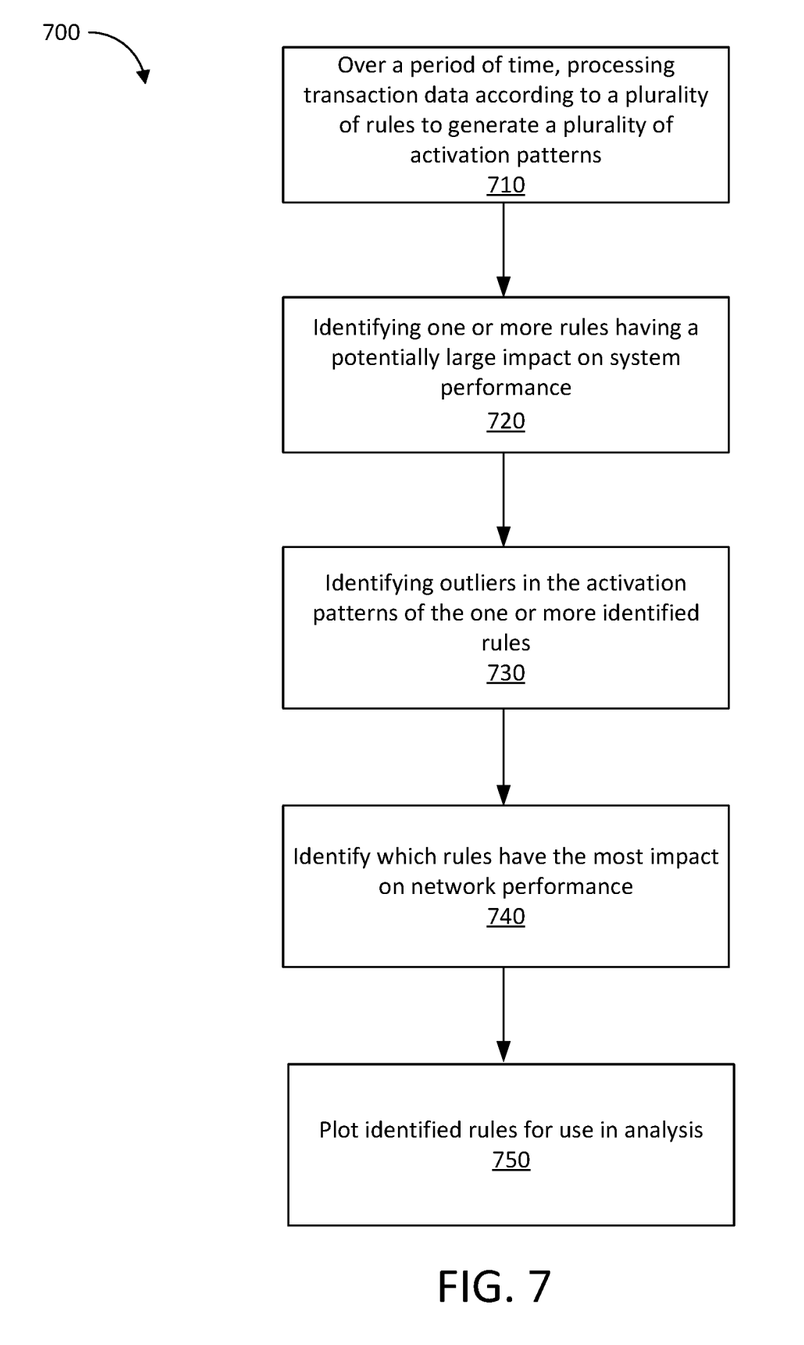
FIG. 7 shows a flow diagram of a method in accordance with some embodiments.

FIG. 7 illustrates a flow diagram of a method 700 in accordance with some embodiments of the present disclosure. The method 700 may be performed by any suitable computing device, such as computing device 400 of FIG. 4. The computing device 400 may receive a data set corresponding to an exchange of data (a transaction) over a network. The data set may be over a particular unit of time and it may include the error rate, the propagation time, and the channel quality among others.

At step 710, in response to receiving the data set, processor 410 may process the data set using a plurality of rule sets to generate a plurality of activation values. More specifically, the processor 410 may process the data set using each feature set sequentially. For example, processor 410 may process the data set using the bandwidth rule set first, and thus may extract data regarding the channel bandwidth and achievable signal-to-noise ratio of the network. The processor 410 may then generate as output, an activation value indicating the available channel bandwidth and the achievable signal to noise ratio.

Processor 410 may then process the data set using the throughput rule set, and generate as an activation value, a percentage of data that was successfully delivered per unit of time. For example, processor 410 may generate activation values indicating that during a 10 millisecond interval, 70% of the data transmitted was successfully delivered to a particular user. In this manner, the processor 410 may apply each rule set in turn and generate corresponding activation values. In this embodiment, the final output may be unknown and the system may be referred to as fully masked, similar to FIG. 4. In an embodiment, processor 410 may apply each rule set to the data set simultaneously. As discussed above, the activation values generated for all the rules for a particular data set may be referred to as an activation pattern.

Processor 410 may continuously monitor activation patterns generated over a period of time. During that time, processor 410 may track the activation patterns (and thus, the activation values of each rule) on a per transaction basis. Upon processing each data set, processor 410 may then generate a transaction matrix (shown in FIG. 5A) using the activation patterns. It is appreciated that each row represents the activation pattern for a particular transaction and each column represents the activation values for a particular rule.

The processor 410 may continue monitoring and adding the activation patterns for each data set in this way until the expiration of the predetermined time period. FIG. 5A illustrates a transaction matrix 500 representing the activation patterns of the system 100, for example, over the predetermined period of time. Although not shown, the values of the outputs for various rules have different units of measurement (e.g. bits/second, BER).

Referring back to FIG. 7, at step 720, processor 410 may identify one or more rules potentially having a large impact on network performance. Prior to this identification, processor 410 may normalize the activation values of the matrix in order to compensate for the different units of measurement between activation values in a particular activation pattern (i.e. between activation values for different rules). Processor 410 may then calculate the standard deviation of each column in the transaction matrix, along with the correlation matrix of the transaction matrix. The correlation matrix of the transaction matrix may yield the correlation among the rules in each activation pattern. Processor 410 may select for further analysis, one or more rules having a standard deviation among their activation values that exceeds a predefined threshold, while having a correlation with each of the other rules that is below a predefined correlation threshold. Processor 410 may remove from the transaction matrix each column not corresponding to one of the selected one or more rules. In this way, processor 410 may generate a pared down transaction matrix having activation patterns that represent the activation values for rules having a potentially large impact on network performance as well as relatively little redundant information (hereinafter referred to as an analysis matrix). FIG. 5B represents an analysis matrix generated after processor 410 has removed from a transaction matrix features that do not have a potentially large impact on network performance. In the example of FIG. 5B, network latency has been removed, indicating that it is not a potentially impactful feature with respect to network performance.

Referring back to FIG. 7, at step 730, the processor 410 may determine outliers in the activation patterns of the analysis matrix. More specifically, processor 410 may use any suitable unsupervised machine learning algorithm to identify outlier activation patterns of the selected rules. Examples of such suitable algorithms may include kernel density estimation, density based clustering, and isolation forest. In some embodiments, identified outlier activation patterns may correspond to, for example, data communication transactions that have unusually large bandwidths, or unusually low error rate.

At step 740, processor 410 may identify one or more rules having the most impact on network performance (i.e. the network performance indicators that are outputs of the computing device 400) by applying the rules having potentially large impact on the system performance, as identified in step 720, to the identified outliers, as identified in step 730. More specifically, for a given activation pattern in the analysis matrix, processor 410 may calculate how much each activation value in the given activation pattern diverges (e.g. the absolute difference) from its corresponding rule's median activation value. Processor 410 may use weighted absolute difference which may be a product of the absolute value and the weight of the corresponding rule to generate a divergence score for each activation value. The rules may be ordered based on the divergence scores of their corresponding activation values. In some embodiments, processor 410 may set the weight corresponding to each rule to 1. For example, referring again to FIG. 5B, processor 410 may analyze transaction 1. Processor 410 may determine the median bandwidth value of all transactions as 5, and thus the deviation for the bandwidth activation value in transaction 1 may be determined as 5. Processor 410 may multiply this value by the absolute value of the feature weight assigned to bandwidth (in this case 1) to obtain a divergence score of 5. Similarly, processor 410 may determine the divergence score for throughput and error rate to be 2 and 4 respectively. Thus, processor 410 may rank (in order of impact on network performance) bandwidth first, error rate second, and throughput third. Referring back to FIG. 7, in some embodiments, processor 410 may calculate how much each activation value in the given activation pattern diverges from its corresponding rule's median activation value based on the raw deviation (e.g., without factoring in the weights assigned to each rule or by setting the weight corresponding to each rule to 1).

At step 750, for each rule or rules identified as potentially having large impact, processor 410 may then take a predefined number of the top rules and plot each on a density plot or histogram against all other values for that feature. In this way, a user can determine which rules to analyze when attempting to identify the cause of the anomaly (outlier activation pattern).

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, receiving, transmitting, generating, aggregating, normalizing, creating, forming, correlating, analyzing, comparing, etc. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
   receiving a data set, wherein the data set includes a plurality of data subsets wherein each data subset is associated with one transaction;
   processing each data subset according to a plurality of rules to generate a plurality of activation values and an output for the each data subset, wherein the plurality of activation values and the output for the each data subset form an activation pattern for the each data subset;
   generating a predictive model based on the activation patterns, wherein the predictive model is based on a regression algorithm; and
   identifying a subset of transactions as outliers based on the predictive model.

2. The method of claim 1, wherein the identifying comprises:
   comparing plurality of activation values to values generated by the predictive model evaluating the data set; and
   identifying the subset of transactions as outliers responsive to the comparison being greater than a threshold value.

3. The method of claim 1 further comprising:
   comparing each activation value generated by the predictive model evaluating the data set to the plurality of activation values generated based on the plurality of rules; and
   identifying a subset of activation values as outliers responsive to the comparison being greater than a threshold value.

4. The method of claim 1 further comprising:
   ordering rules of the plurality of rules based on weight associated with each term of the predictive model.

5. The method of claim 4, wherein a weight associated with a term of the predictive model indicates the associated rule impact on output of a transaction, wherein a first weight of a first term greater than a second weight of a second term indicates that a rule associated with the first weight has more impact on output of the transaction in comparison to a rule associated with the second weight.

6. The method of claim 4 further comprising:
   selecting a predetermined high ordered rules to form a subset of rules of the plurality of rules.

7. The method of claim 6 further comprising:
   processing the identified outliers based on the subset of rules of the plurality of rules.

8. A method comprising:
   receiving a data set, wherein the data set includes a plurality of data subsets wherein each data subset is associated with one transaction;
   processing each data subset according to a plurality of rules to generate a plurality of activation values and an output for the each data subset, wherein the plurality of activation values and the output for the each data subset form an activation pattern for the each data subset;
   generating a predictive model based on the activation patterns;
   identifying a subset of transactions as outliers based on the predictive model;
   forming a correlation matrix based on the predictive model;
   removing rules of the plurality of rules associated with correlation value exceeding a correlation value threshold to form a first subset of rules of the plurality of rules; and
   processing the outliers based on a subset of rules of the plurality of rules.

9. The method of claim 8, wherein the identifying comprises:
   comparing plurality of activation values to values generated by the predictive model evaluating the data set; and
   identifying the subset of transactions as outliers responsive to the comparison being greater than a threshold value.

10. The method of claim 8, wherein the predictive model is based on a regression algorithm.

11. The method of claim 8 further comprising:
    comparing each activation value generated by the predictive model evaluating the data set to the plurality of activation values generated based on the plurality of rules; and
    identifying a subset of activation values as outliers responsive to the comparison being greater than a threshold value.

12. The method of claim 8 further comprising:
    ordering the first subset of rules of the plurality of rules based on weight associated with each term of the predictive model.

13. The method of claim 12, wherein a weight associated with a term of the predictive model indicates the associated rule impact on output of a transaction, wherein a first weight of a first term greater than a second weight of a second term indicates that a rule associated with the first weight has more impact on output of the transaction in comparison to a rule associated with the second weight.

14. The method of claim 12 further comprising:
    selecting a predetermined high ordered rules from the first subset of rules of the plurality of rules to form a second subset of rules of the plurality of rules.

15. The method of claim 14 further comprising:
    processing the identified outliers based on the second subset of rules of the plurality of rules.

16. The method of claim 8, wherein the processing the outliers based on the first subset of rules of the plurality of rules.

17. A computing device comprising:
one or more processors;
a non-transitory computer-readable medium storing instructions that, when executed by one or more processors of the computing device, cause the computing device to perform operations comprising:
receiving a data set, wherein the data set includes a plurality of data subsets wherein each data subset is associated with one transaction;
processing each data subset according to a plurality of rules to generate a plurality of activation values and an output for the each data subset, wherein the plurality of activation values and the output for the each data subset form an activation pattern for the each data subset;
generating a predictive model based on the activation patterns using a regression model algorithm;
identifying a subset of transactions as outliers based on the predictive model;
forming a correlation matrix based on the predictive model;
removing rules of the plurality of rules associated with correlation value exceeding a correlation value threshold to form a first subset of rules of the plurality of rules; and
processing the outliers based on a subset of rules of the plurality of rules.

18. The computing device of claim 17, wherein the identifying comprises:
comparing plurality of activation values to values generated by the predictive model evaluating the data set; and
identifying the subset of transactions as outliers responsive to the comparison being greater than a threshold value.

19. The computing device of claim 18, wherein the operations further comprises:
ordering the first subset of rules of the plurality of rules based on weight associated with each term of the predictive model;
selecting a predetermined high ordered rules from the first subset of rules of the plurality of rules to form a second subset of rules of the plurality of rules; and
processing the identified outliers based on the second subset of rules of the plurality of rules.

20. A method comprising:
receiving a data set, wherein the data set includes a plurality of data subsets wherein each data subset is associated with one transaction;
processing each data subset according to a plurality of rules to generate a plurality of activation values and an output for the each data subset, wherein the plurality of activation values and the output for the each data subset form an activation pattern for the each data subset;
generating a predictive model based on the activation patterns;
ordering rules of the plurality of rules based on weight associated with each term of the predictive model, wherein a weight associated with a term of the predictive model indicates the associated rule impact on output of a transaction, wherein a first weight of a first term greater than a second weight of a second term indicates that a rule associated with the first weight has more impact on output of the transaction in comparison to a rule associated with the second weight; and
identifying a subset of transactions as outliers based on the predictive model.

* * * * *